April 23, 1940.   P. J. HOLMES   2,198,113
NAVIGATION METHOD AND APPARATUS
Filed Sept. 30, 1938   4 Sheets-Sheet 3

PAUL J. HOLMES,
INVENTOR.

BY *Arthur P. Knight*
*Alfred W. Knight*
ATTORNEYS.

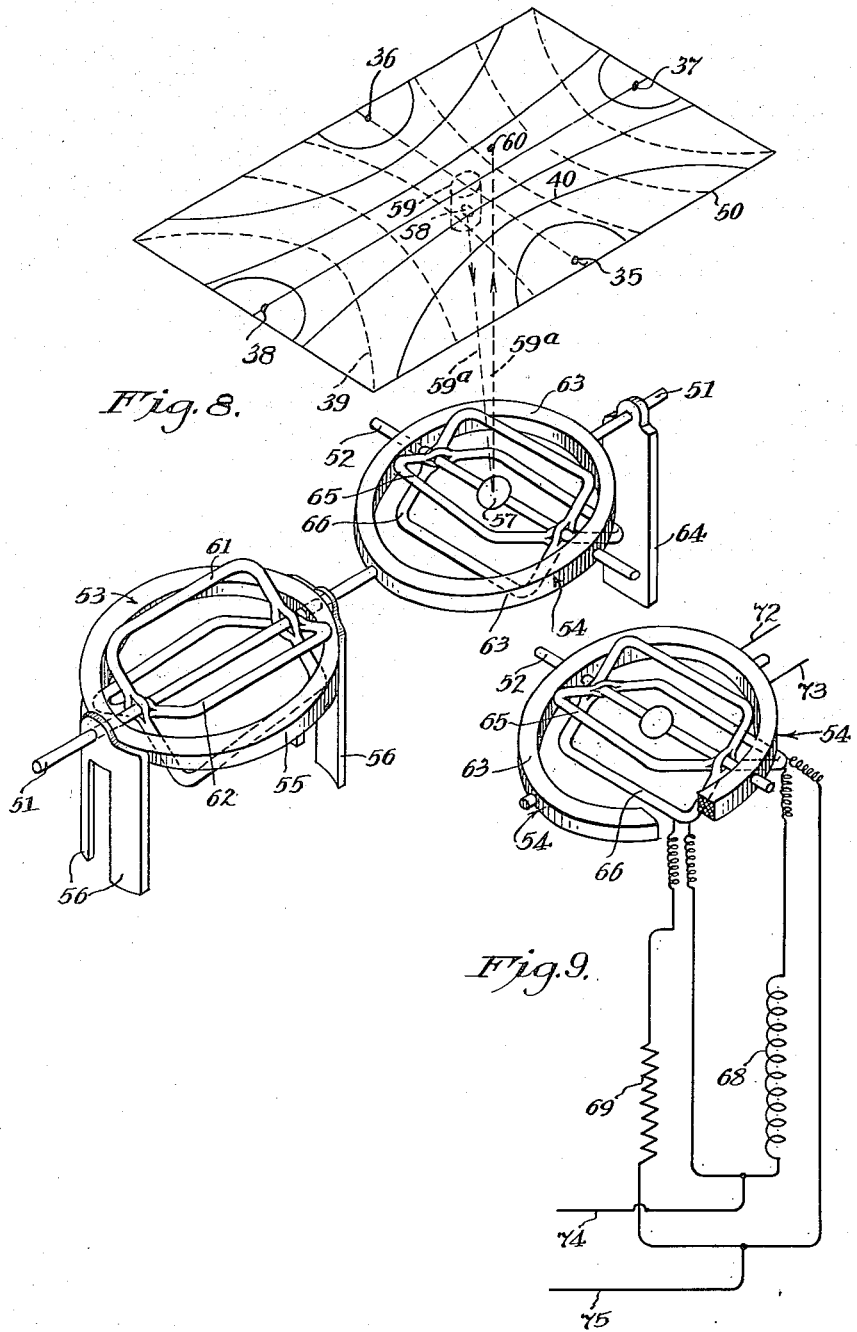

Patented Apr. 23, 1940

2,198,113

UNITED STATES PATENT OFFICE 2,198,113

NAVIGATION METHOD AND APPARATUS

Paul J. Holmes, Los Angeles, Calif., assignor of forty per cent to William H. Donnelly, Los Angeles, Calif.

Application September 30, 1938, Serial No. 232,558

11 Claims. (Cl. 250—2)

This invention is concerned generally with aerial navigation and more particularly with a method and apparatus for determining the location of an airplane or other body. Determination of the location may be more or less comprehensive in the steps taken and the completeness of the data obtained; thus it may be sufficient to determine only the distance of the body from a known point or the presence of the body on a predetermined course, or it may be desired to further include a complete determination of position, as by horizontal azimuth and distance from a known point. It is to be understood that the method and apparatus herein disclosed and claimed are not limited to use with any particular body, as for example with airplanes, but are adapted for use in locating bodies in general, whether in the air or on land or water and whether moving or stationary. However, in order to clearly set forth an illustrative embodiment, my method and apparatus will be described primarily as employed for guiding and locating airplanes in flight, because it is particularly designed and adapted to this purpose.

Numerous radio navigation systems have been proposed and some of them are in use, and the principal shortcoming or limitation upon the usefulness of those systems used commercially is that they require directional transmitting and/or receiving apparatus. A system of triangulation is usually employed for determining the geographical location of a body. For example, a perceptible signal is radiated from the body and is received substantially simultaneously by two spaced direction-finders which obtain the directional bearing of the body. For any reasonable accuracy the body and the direction-finding stations are preferably arranged substantially in an equilateral triangle. It is not always possible to have the body and the direction-finding stations in an optimum triangular relation. There are definite disadvantages to this system because accurate directional bearings are frequently difficult to obtain. Furthermore, the bearings obtained have to be sent either separately or in correlated form to the airplane or mobile body. This requires time and involves human elements. Also, since numerous operations are involved, the errors produced by each operation are cumulative and tend to introduce a large error in the final data. Another disadvantage of such triangulation systems is that, with fixed direction-finding stations on the ground, the location service is available to only one body at a time instead of being continuously available to any or all of a number of mobile bodies located within a given area.

In some systems navigational guidance is provided by a radio beam consisting of a path or course of given angular direction and of known geographical location. Unless the airplane is on course to begin with considerable flight over unknown and hazardous terrain may be necessary before the plane arrives on the course of known geographical location.

With most navigation systems, as for example in the conventional radio beam system, it is difficult for the airplane to determine its distance along the beam from the beam source with any degree of accuracy. It is, therefore, a particular object of this invention to provide a method and apparatus which may be used in conjunction with existing systems to provide an indication of the distance of the body from a given location and when flying a given course to give the absolute geographical location of the body. For example, the methods and apparatus herein disclosed and claimed may be employed advantageously with the radio navigation method and apparatus disclosed and claimed in the copending application of William H. Donnelly and Paul J. Holmes, Serial No. 219,702, filed July 11, 1938.

A particular object of this invention is to provide a method and apparatus for determining the location of a body without the use of directional apparatus such as loop antennae.

A further object of the invention is to provide a method and apparatus with which the location of a body may be obtained without resorting to elaborate mathematics or to triangulation as is commonly employed and practiced.

A further object of the invention is to provide a method and apparatus for determining the distance between two radiating stations without employing a triangulation point.

Another object of the invention, according to one embodiment thereof, is to provide a method and apparatus with which the geographical location of a number of mobile bodies may be simultaneously determined.

A further object of the invention is to provide a method and apparatus for aerial navigation by means of which an airplane may fly a fixed course irrespective of the wind direction and velocity.

Another object of the invention is to provide a method and aparatus for determining the position of a mobile body on a map.

A further object of the invention is to provide a method and apparatus for recording, automatically and continuously, the movement and position of a mobile body on a map so that a record may be obtained which will be of value in case of a wreck or will furnish a basis for rating the ability of a pilot.

Another object of the invention is to provide a radio navigation method and apparatus which may be used in conjunction with well-known control equipment to provide for the automatic piloting of an airplane or other mobile body.

Another object of the invention is to provide a radio navigation method and apparatus which is relatively simple in operation and construction.

A definite object of the invention is to provide a definite pattern in space formed by waves which are propagated from a plurality of spaced sources, and which pattern may be used for determining the location of a body.

Another important object of the invention is to provide a method and apparatus for determining the location of a body which is operative when the body is at any position within a relatively large area and is not confined to particular narrow zones of flight as when following the conventional radio beam.

Further objects and advantages of the invention, of which the above are typical, will become apparent as the description proceeds.

In general, radio, sonic and super-sonic waves are endowed with definite time and distance characteristics. Thus, a wave of a given frequency rotates a given number of electrical degrees in a given period of time and when the wave is radiated it travels a given distance in a given period of time. Thus, the phase rotation undergone by a radiated wave after radiation may be used as a measure of time and distance. The speed of travel of a radiated wave depends upon the medium through which the wave is propagated, which in turn determines the physical length of the wave. An electromagnetic wave travels through space at a constant speed approximating that of light or 186,000 miles per second.

For any given frequency the phase of the wave front, at a given distance from the point of radiation, has a definite and calculable relation to the phase of the wave front at the point of radiation. There is a phase rotation with distance which is a natural characteristic of propagated waves; and the distance between any two points in space located on a line radiating from the position of propagation, may be determined from the phase relation between the waves received at the two points. This requires basically the measurement of the time required for a propagated wave to travel between points in space whereby the distance between the points may be determined.

When a radio or electromagnetic wave is modulated by an oscillation, for example in the sonic wave spectrum, and propagated from a radiator, the carrier wave travels through space at the speed of light and the modulating oscillation impressed upon the carrier wave travels therewith at the same speed. Thus, it is apparent that the phase rotation undergone by an oscillation modulating a carrier wave after radiation may be used as a measure of time and distance.

Thus my invention includes essentially the steps of radiating a wave into space and determining the position of a body from the time required for the wave to travel between the body and a known position. In its broadest aspect my invention may be practiced with waves in general, that is, electromagnetic, sonic or super-sonic waves. Since electromagnetic waves are useful over great distances and since the greatest utility of the invention resides in determining the location of the body over a considerable distance range, I will confine the description of the invention to the use of electromagnetic waves, and it will be understood that in general, satements concerning electromagnetic waves will also apply to other types of waves.

For example, the method of determining the location of a body according to my invention may include the steps of radiating a modulated electromagnetic wave into space from a known point which is spaced from the body. For example, I may radiate the modulated electromagnetic wave from a radiator located adjacent an airport and may receive the electromagnetic wave on a body such as an airplane at a position spaced from the airport. The modulation traveling on the radiated electromagnetic wave undergoes a phase rotation in traveling on the wave between the point of radiation thereof and the airplane, and I produce a perceptible indication which varies with changes in the magnitude of such phase rotation. Such a perceptible indication may be produced by directly comparing the phase difference between the modulation of the wave as received at the airplane and the modulation of the wave then being radiated. By radiating modulated electromagnetic waves from a plurality of known positions and receiving said waves on an airplane located at a position spaced from said known positions, the geographical location of the airplane with respect to the known positions may be determined by comparing the phase rotation undergone by the modulation frequencies carried by the various carrier waves in traveling from their positions of radiation through space to the radio receiver carried on the airplane.

Apparatus according to this invention for determining the position of a body includes essentially means for propagating waves into space and means for determining the time required for the waves to travel between a fixed position and the body. In one form, I may provide means for radiating modulated electromagnetic waves into space from a radio transmitter located at a fixed position spaced from an airplane and I may provide radio receiving means on the airplane for receiving said modulated wave and for producing a perceptible indication which varies with the phase of the modulation of the waves so received as compared to the phase of the modulation of the waves then being radiated.

The method and apparatus for making such location determinations include the following illustrative examples, which are better described in conjunction with the accompanying drawings, in which:

Fig. 8 is a diagrammatic representation of an apparatus for indicating or recording the position of a body; and Fig. 9 is a diagrammatic representation of a phase angle responsive means.

Figure 1:
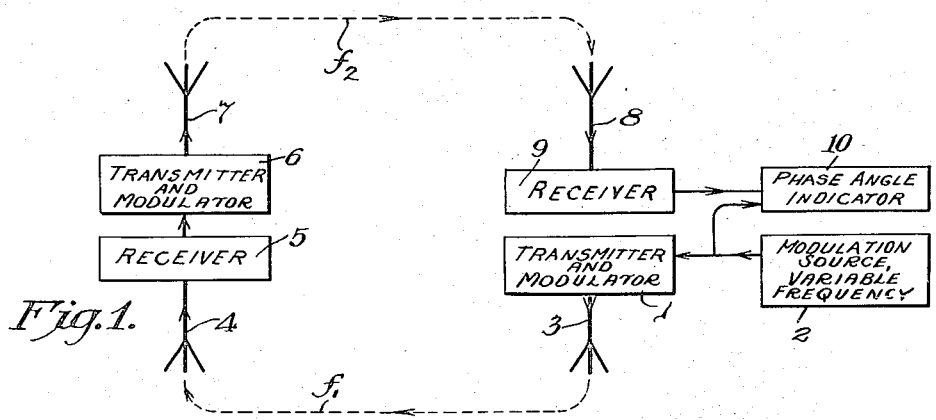
Fig. 1 is a diagrammatic illustration of an apparatus for determining the distance between two radiators.

Referring to Fig. 1, a radio transmitter 1 with modulation source 2, and a radio receiver 9 with phase angle indicator 10, are located on a mobile body, such as an airplane in flight. Radio receiver 5 and transmitter 6, as shown, are located at a fixed position such as the destination or landing field of the airplane. A low frequency oscillation, generated by modulation source 2, modulates the carrier wave of frequency $f_1$, generated by radio transmitter 1, which is radiated from radiator 3. The modulated carrier $f_1$ is intercepted by antenna 4, amplified and demodulated by receiver 5, and applied to control the modulation of carrier wave of frequency $f_2$, generated by radio transmitter 6, which is radiated from radiator 7. Antenna 8, located on the mobile body, intercepts the modulated carrier $f_2$, which is amplified and demodulated by receiver 9 and the modulation fed to the phase angle indicator 10. The phase angle indicator 10 is also connected to the modulation source 2. The phase angle indicator may comprise a direct reading indicator, such as a modified crossed coil Tuma indicator or it may comprise a cathode ray tube with one set of deflection plates connected to the output of the receiver and the other set of plates connected to the modulation source 2. In any event the literature is replete with indicating phase angle meters and the most advantageous meter is a matter of selection. The receiver 5 and transmitter 6 may be so constructed and adjusted that the radiated modulating oscillation of $f_1$ intercepted by antenna 4 is radiated by radiator 7 on $f_2$ in phase, so that in effect, the modulating oscillation radiated from 3 is reflected from the fixed position of 4 and 7 back to the position of 8 and 3.

The radiated low frequency oscillation of modulation source 2, modulating the carrier waves of $f_1$ and $f_2$, travels through space from the mobile body to the fixed position, where it is, in effect, reflected back to the mobile body all at the speed of light. It therefore has definite values of phase rotation for definite distances between the mobile body and the fixed position. The phase angle as indicated in indicator 10 will have a value that is in direct proportion to the distance between the mobile body and the fixed position. As an example, when the frequency of the modulation source 2 is 5,000 cycles per second, the wave length is 37.2 miles. If the phase angle indication at 10 is 180° the distance existing between the mobile body and the fixed position will be 9.3 miles, that is, a quarter wavelength of the oscillation will exist between the mobile body and the fixed position, and since the radio station at the fixed position, in effect, reflects the oscillation, a quarter wavelength will likewise exist between the fixed position and the mobile body. When the frequency of the oscillation is 500 cycles per second, and the phase angle indication 90°, the distance of the mobile body from the fixed position will be 46.5 miles. Thus, for a given frequency, the distance of the airplane from the fixed position may be readily determined from the value of the phase angle indicated in indicator 10. Alternatively, I may vary the frequency of the modulation source 2 to give a predetermined phase angle reading at 10, for example 90°, and determine the distance of the airplane from the fixed position by the value of the frequency required to bring about the predetermined value of phase angle indication.

It is appreciated that the transmitters and receivers may produce a phase displacement of the modulating oscillation in addition to the phase displacement occurring in space. However, suitable phase changing networks as are well known to the art, may be introduced into the system to compensate for the phase displacement produced by the receiving and transmitting equipment. In any event, any appreciable change in displacement produced by the equipment can be taken into consideration.

In effect, according to this invention, the position of the body, with respect to a known location, is determined by measuring the length of the superimposed wave existing in space between the body and the known position, or alternatively, the location of a body is determined by obtaining a perceptible indication which depends upon the length of time required for a wave to travel through space between the body and the known location. Theoretically, it is not necessary to reflect the modulating oscillation back to its source to determine its phase rotation through space as there will be an apparent change in the phase of the modulation as received in a distant location as compared to the phase of the modulation, at a given time, at the position of radiation thereof. However, at the present time there are not any time standards that may be maintained with the desired degree of accuracy, so the reflected wave is used to provide a convenient time standard.

Figure 2:
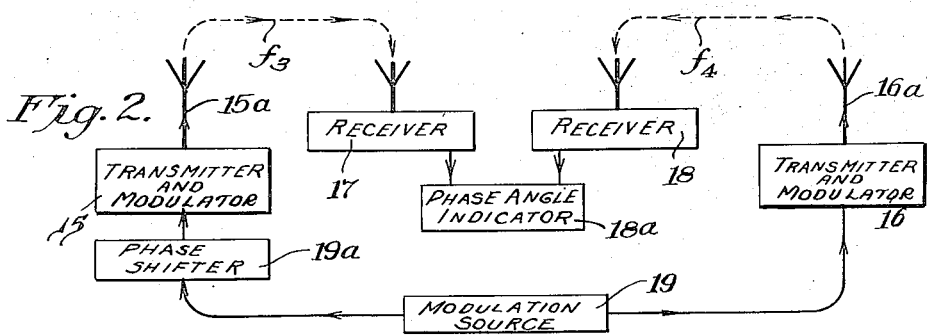
Fig. 2 is a diagrammatic illustration of an apparatus arrangement for obtaining the relation of a body with respect to two spaced radiators.

Referring to Fig. 2, a somewhat modified arrangement for determining the location of a body is illustrated, which has an advantage over Fig. 1 in that it is not necessary to transmit and receive simultaneously on the body. Radio transmitters 15 and 16 generate carrier waves of frequencies $f_3$ and $f_4$, which are respectively radiated from radiators 15a and 16a. The radiators and transmitters are located at two spaced fixed positions, for example on the order of 100 miles apart, which positions, we may assume for the moment, are two airports located on a course to be traveled by an airplane. A low frequency oscillation, generated by modulation source 19 connected to both transmitters, modulates the carrier waves $f_3$ and $f_4$ simultaneously. Radio receivers 17, 18 and phase angle indicator 18a are mounted on the mobile body, such as the airplane traveling on the course between the two airports. The modulated carrier waves $f_3$ and $f_4$, simultaneously radiated from the fixed positions 15a and 16a, are respectively received, amplified and preferably demodulated by receivers 17 and 18. The resulting modulation from each of the receivers is fed to the phase angle indicator 18a, which may be a direct reading indicator or meter of any one of the various types.

The frequency of the modulating oscillation may have any given wavelength relation to the distance between the radiators 15a and 16a. I prefer to utilize a frequency of oscillation such that one-quarter of its wavelength is equal to the distance between the radiators, considering the velocity of propagation equal to the speed of light. For convenience, I also prefer that the modulating oscillation is radiated in phase at the radiators. Assuming that the modulation source 19 is connected to the transmitters by land lines, this phasing may be readily accomplished through the use of suitable phasing networks, as is apparent to those skilled in the art. Such a network is indicated by phase shifter 19a connected between modulation source 19 and transmitter 15.

It is apparent that if the carriers radiated by the two radiators 15a and 16a are modulated by the same modulation frequency and in a definite phase relation, for any given position in space the phase relation between the modulating oscillations on the two carriers $f_3$ and $f_4$ will have a definite and fixed relation.

To take a simple case, when the modulating oscillation is radiated in phase at the radiators 15a—16a and the modulation frequency is such that one-quarter of its wavelength is equal to the distance between the radiators, the phase angle between the modulations on the two carriers will be zero at a point equidistant from the radiators. At a position adjacent either one of the radiators the phase angle will be 90°, which condition may be indicated in the indicator 18a, and for other positions the phase angle in degrees will be proportional to the difference of the distances from each radiator to the position of the body. In other words, the phase angle changes in proportion to the distance traveled between the radiators.

Thus, the phase angle indicator carried on the mobile body may be calibrated directly in terms of distance from the radiators 15a or 16a and may consist of a zero center type meter with 90° lag occurring at the left of zero and 90° lead at the right of zero. For the above case, by utilizing the modulation of one carrier wave received on the mobile body as a reference wave, the phase angle indicated by 18a will lead when the mobile body is adjacent one of the radiators and will lag when adjacent the other radiator. A maximum or minimum of 90° will occur when the mobile body is directly adjacent one of the radiators. It is now apparent that the geographical location of an airplane traveling on a direct course between two airports may be indicated by the phase angle reading described above, and that the phase angle indicated will change in direct proportion with the distance of the airplane out along the course.

It will be appreciated that the transmitters 15 and 16 need not be connected by land lines to the modulation source 19 and that the time synchronization of the modulation frequencies supplied to the transmitters may be accomplished in other manners. For example, the modulation source 19 may be located adjacent the transmitter 16 and connected thereto by a wire line. The transmitter 15 may be modulated by the modulation of the carrier wave transmitted by transmitter 16 and received in a receiver located adjacent the transmitter 15 after the manner of the receiver and transmitter 5 and 6 in Fig. 1.

It can be seen that when two stations have a fixed space between them they may be synchronized to modulate in any desired phase relation by simply adjusting the frequency of the modulating oscillation until the desired phase relation is obtained. In effect a standing wave pattern of the low frequency modulating oscillation is produced in the space between the radiators, which has definite phase relations at definite positions between the radiators. This standing wave pattern may consist of any portion of a cycle or any number of cycles of the low frequency modulating oscillation, the exact value being dependent upon the frequency.

Figure 3:
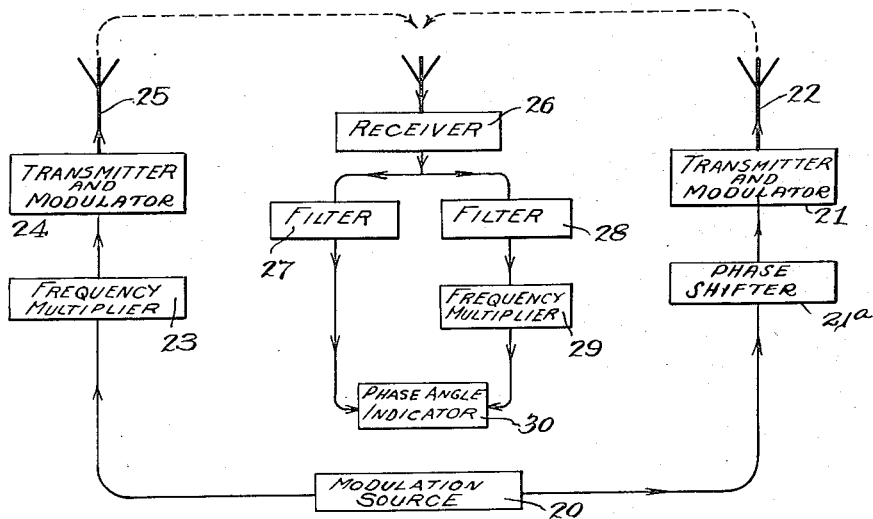
Fig. 3 is a diagrammatic representation of a variational arrangement of the apparatus illustrated in Fig. 2.

A variational form of my apparatus is illustrated in Fig. 3, in which spaced radiators 22, 25 and radio transmitters 21, 24 are shown. A modulation source 20 supplying a modulation frequency of say 500 cycles per second, is directly connected to transmitter 21 where the 500 cycle modulation frequency is impressed upon the generated carrier wave and radiated at a given carrier frequency into space from radiator 22. The modulation source 20 is also connected by suitable means, as through land lines, to a frequency multiplier 23 which, for the purposes of illustration, may double the supplied modulation frequency, thus supplying a 1,000 cycle modulation to transmitter 24, where this modulation frequency is impressed upon the generated carrier wave radiated from radiator 25 at a given carrier frequency.

The frequencies of the carrier waves generated by the transmitters 21 and 24 may be the same and the distance between the respective radiators 22 and 25 is preferably such that the 1,000 cycle modulation rotates 90° in phase in traveling through space between the radiators. The phase of the modulation frequencies superimposed upon the radiated carriers should bear a known or constant relation to one another as they are radiated from their respective radiators 22 and 25. This may be accomplished by the use of well known means such as a phase shifter 21a. A receiver 26 carried on a mobile body located at some position between the radiators 22 and 25 and for the purposes of example on the line joining the radiators, may be tuned to simultaneously receive the modulated carrier waves radiated by the radiators 22 and 25. The received waves may be demodulated and fed to filters 27 and 28 where the modulations are separated. Filter 27 is adapted to pass the 1,000 cycle modulation and reject the 500 cycle modulation, while filter 28 is adapted to pass the 500 cycle modulation and reject the 1,000 cycle modulation. The output of filter 27 is connected to the phase angle indicator 30. The output of filter 28 is fed to a frequency multiplier 29 which multiplies the applied frequency by an amount corresponding to the frequency multiplier 23. Thus the two different separate modulation frequencies are changed to two separate modulations of the same frequency. The output of the frequency multiplier 29 is also connected to the phase angle indicator 30, where in effect the phase of the modulation of the carrier wave received from radiator 25 may be compared to the phase of the modulation of the carrier wave received from radiator 22 by comparing the phase relation of the two separate modulations of the same frequency. When the receiver 26 is located on the line joining the radiators 22 and 24, the position of the mobile body carrying the receiver may be directly ascertained by the phase difference reading as described in relation to Fig. 2

Figure 4:
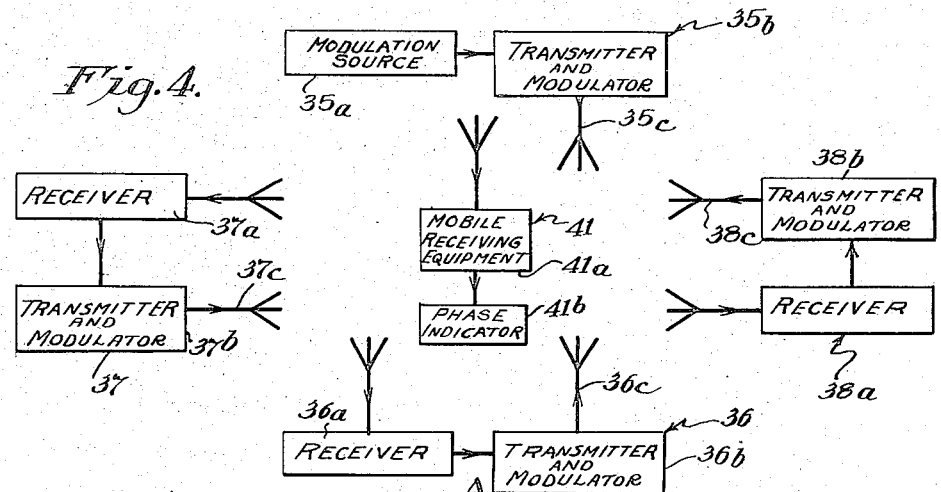
Fig. 4 is a diagrammatic illustration of an apparatus arrangement which may be used to determine the position in space of a body.
Figure 5:
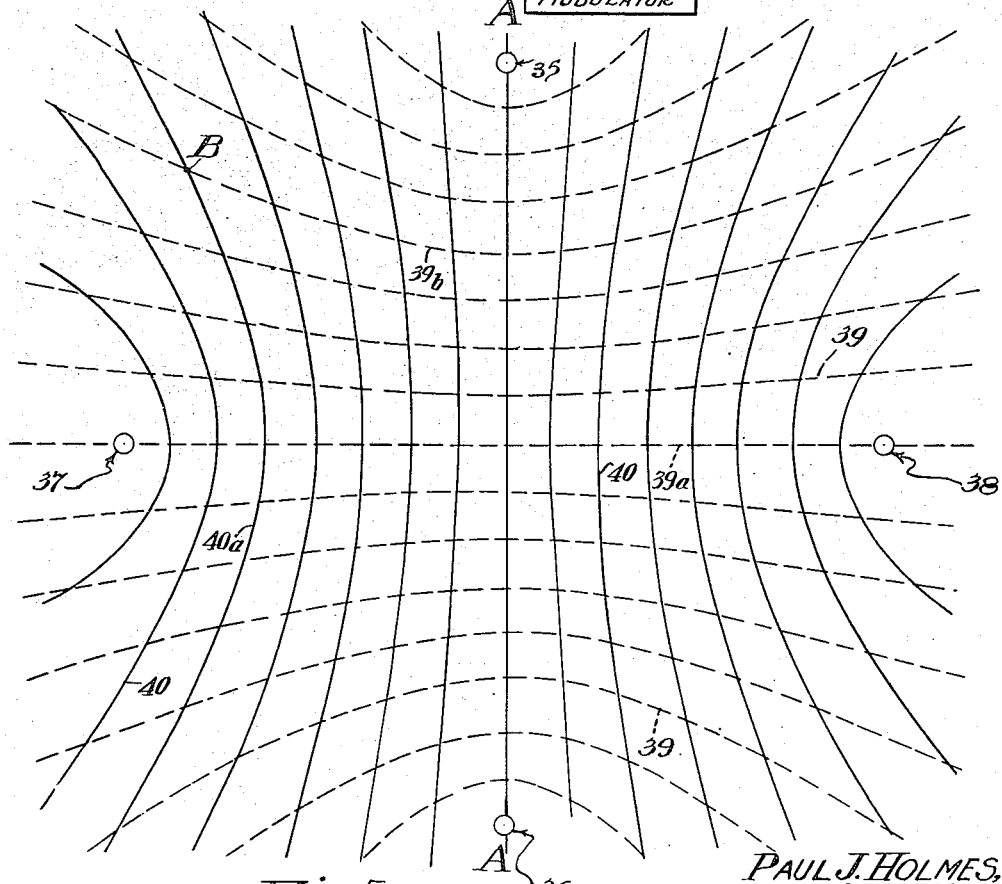
Fig. 5 illustrates phase conditions which may be obtained in space when using the apparatus arrangement illustrated in Fig. 4.

Referring to Figs. 4 and 5, an apparatus arrangement is illustrated which may be used to directly determine the location of a body such as an airplane, that is, the distance and azimuth of an airplane from a given position. A station unit 35 is shown as comprising a modulation source 35a connected to modulate the carrier of a radio transmitter 35b which radiates a modulated carrier from radiator 35c. A second station unit 36 is shown spaced from the unit 35 and may comprise a radio receiver 36a adapted to receive the wave radiated from transmitter 35b and control the modulation of the carrier generated in transmitter 36b and radiated from the radiator 36c. As was brought out above, when the stations 35 and 36 are radiating carriers which are modulated in a fixed phase relation, in any of the manners described in relation to Figs. 1-3, there is a definite phase relation between the modulation frequencies as received along straight line A—A joining the two stations and the location of the point of reception on the line. Thus definite phase difference values represent definite positions on this line. For any given value of phase difference existing on the line A—A, there are also other points in space in which the same phase difference exists. Lines may be drawn joining all the points of the same phase difference and the dotted lines 39 in Fig. 5 each represent such a line joining points of the same constant phase difference produced by stations 35 and 36. The lines, which form a definite pattern in space, may be called isophase difference lines and the phase difference as measured on one line differs by a given amount from the phase difference as measured on an adjacent line.

Any one of the lines may be used as a course and an airplane may follow any one of them by guiding the plane to maintain the phase indicator carried thereby at any predetermined value corresponding to a desired course. For any given course consisting of a particular value of phase difference, a deviation to a position left or right of the course produces a corresponding lead or lag of phase difference, as compared to the predetermined value, which may be used to provide automatic piloting of the plane when used in conjunction with well-known automatic control apparatus. A straight course may be flown by following the straight phase difference line 39a located symmetrically with respect to stations 35 and 36 or a curved course may be flown by following any of the other lines 39. The greatest curvature in these lines occurs adjacent line A—A, and at positions removed from the line these curves approach straight lines so that straight courses may be followed in the outer regions.

For this disclosure, it may be assumed that when a pair of spaced radiators have their respective radiated carrier waves modulated with a common low frequency oscillation, the phase of which is maintained at fixed values at the respective radiators, a definite pattern of hyperbolic phase difference curves, extending transverse to a line through the radiators and corresponding to different values of phase difference between the modulating oscillation, may be located in space. This pattern of known curves fixed in relation to the spaced radiators, each of which curves can be particularly identified, may be used for navigational guidance, or for determining the distance of a body from an objective and they may also be used to provide a multiplicity of different courses each of known geographical location.

If an airplane is flying a known course such as line A—A which is intersected by lines 39, as for example on a radio beam extending along line A—A, the exact location of the plane may be determined from the value of the phase difference obtained at any point on the course. To do this the pilot may be provided with a map upon which the course is shown along with the isophase difference lines provided by one or more pairs of stations in the area. It is readily apparent that the present airway radio range stations may be utilized as the spaced radio stations in this invention and more especially the simultaneous radio range and telephone transmission stations being installed for simultaneous range and weather broadcasts by the Bureau of Air Commerce. As an example for the last-mentioned system, the carrier wave radiated from the central non-directional radiator being used for weather broadcasts may be modulated with the desired modulation frequency producing the previously described isophase-difference lines. Thus location of an airplane on a radio range course may be determined by providing an additional receiver and suitable filter networks of the band pass and band rejection type connected to a phase angle indicator. Also, a predetermined value of phase difference may be utilized as a marker to indicate the intersection of the beams from the spaced radio range stations used.

Referring again to Figs. 4 and 5, to provide for locating an airplane in a wide area irrespective of whether the plane is flying a fixed course, I may provide a second pair of spaced stations as shown at 37 and 38 of Fig. 5, and for the purposes of simplicity they may be located symmetrically with respect to stations 35 and 36 so that the units form the corners of a square. The stations 37 and 38 may be operated in accordance with the previously illustrated examples of either Figs. 1, 2, or 3 and stations 35 and 36 may be likewise operated and adjusted. The station 37 is spaced from both stations 35 and 36 and comprises a receiver 37a tuned to the modulated carrier wave radiated from 35c and is adapted to control the modulation of the carrier wave generated by transmitter 37b and radiated from 37c. The spaced station 38 consists of a receiver 38a tuned to the modulated carrier wave from 37c and adapted to control the modulation of the carrier wave generated by transmitter 38b which is radiated from radiator 38c.

With the units of each pair spaced the same distance from one another, the same modulation frequency may be used to modulate the carrier waves of each pair and a common modulation source such as source 35a may be employed for this purpose. With such an arrangement the carrier waves supplied by each of the stations may differ from one another so that they may be separately received. Obviously the carrier waves radiated from one pair may be the same and a different carrier wave frequency may be used for the other pair. In this event the modulation frequency supplied to one station of a pair will be different from the modulation frequency supplied to the other station of the pair. Since optimum results are obtained when the stations of any one pair are spaced by a distance which is equal to or less than the distance traveled by the carrier wave while the modulation undergoes a phase rotation of 90°, it may be seen that it will be advantageous in some instances to space each pair of stations at different distances so that different modulation frequencies may be employed and so that each pair of stations may be readily identified.

Receiving equipment 41 which may be carried on an airplane is shown as comprising a radio receiver 41a which is capable of receiving the modulated carrier waves from either pair of stations 35 and 36 or 37 and 38 and which further includes a phase angle indicator 41b that will produce a perceptible indication which will vary in accordance with the phase difference between the modulation of the carriers so received.

Referring now to Fig. 5, the stations 35 and 36 are adjusted to provide the phase difference lines indicated by the dotted lines 39 and the stations 37 and 38 are adjusted to provide the phase difference lines indicated by the solid lines 40. Assume that the mobile receiving equipment 41 is tuned to receive from stations 35 and 36 and that the phase difference as indicated by the phase angle indicator 41b corresponds to a value represented by dotted line 39b, the airplane is then known to be located at some position on this line. If the receiving equipment of 41 is now tuned to receive from stations 37 and 38 and the phase angle indicator 41b shows the phase to be of a value represented by the solid line 40a, the absolute location of the airplane carrying the mobile receiving equipment is indicated by the intersection of the two lines at B. To facilitate determining the location of the airplane, the stations and the isophase difference lines 39 and 40 may be drawn on a geographical map so that the pilot of the airplane may plot his position on this map. Obviously the mobile receiving equipment may include means to receive the waves substantially simultaneously from both pairs of stations and the phase angle indicator 41b may include means for simultaneously producing two sets of perceptible indications, so that the two coordinates required to plot the position are always available.

It is also within the contemplation of this invention to provide means for combining these two coordinates to automatically and continuously indicate the location of the airplane on a map or other means carried thereby, as will be described hereinafter.

From consideration of the above figures it may be seen that it is not necessary to utilize two separate pairs of stations. For example, the stations 35, 36, and 37 of Figs. 4 and 5 may be arranged in a triangular relation as indicated and shown in Fig. 6. With such arrangement the phase difference of the modulation frequency of any one pair of stations, for example, the stations 35 and 37, may be compared with the phase difference of the modulations received from the other pair of stations, for example, the stations 35 and 36. A family of phase difference curves, in Fig. 6, for the modulation frequency of stations 35 and 37 is indicated by dotted lines 41 and the family of curves for the phase difference of the modulation frequency of stations 35 and 36 is indicated by the full lines 39. It is assumed that the modulation frequency of stations 36 and 37 is supplied from the modulation source 35a as shown in Fig. 4 and that this modulation frequency is the same for all the stations. With this arrangement the carrier wave frequencies of stations 35, 36, and 37 are preferably different. Obviously any of the receiving and transmitting arrangements described in relation to Figs. 1 to 5 may be used with the arrangement shown in Fig. 6.

Figure 6:
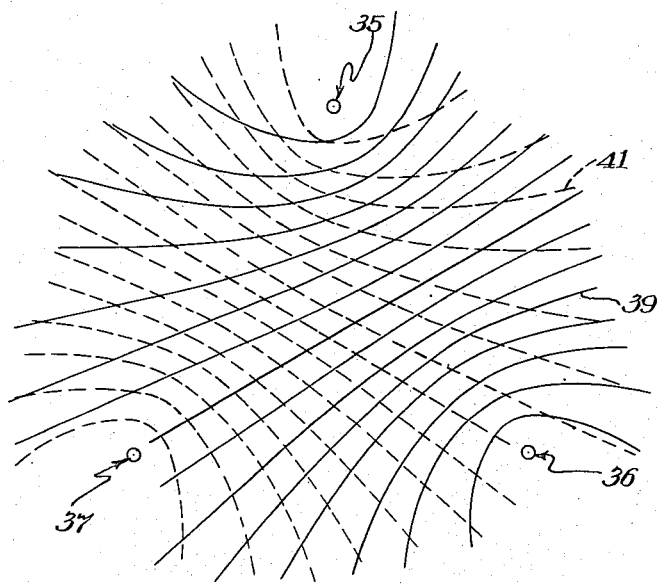
Figs. 6 and 7 are diagrammatic representations of modified arrangements of the apparatus illustrated in Fig. 4.

It is interesting to note that the present airway radio range stations of the RA type with the central non-directional radiator may be used for the spaced radio stations as hereinbefore related. Thus it may now be seen that the radio range stations in addition to providing narrow courses or beams for airplanes may be employed to give the position out along the beam. Wherever the radio range stations form triangles the geographical location in the A or N areas may be obtained on the airplanes with the above modification as shown in Fig. 6, and since the radio range stations cover the United States, transcontinental passenger airplanes may therefore determine their geographical location whether on the radio beam or not. Normally in good weather the planes depend upon compass direction and landmarks for navigation. Thus when they are off the radio beam and fly suddenly into overcast regions the location of the plane from the beam may be quickly determined.

Figure 7:
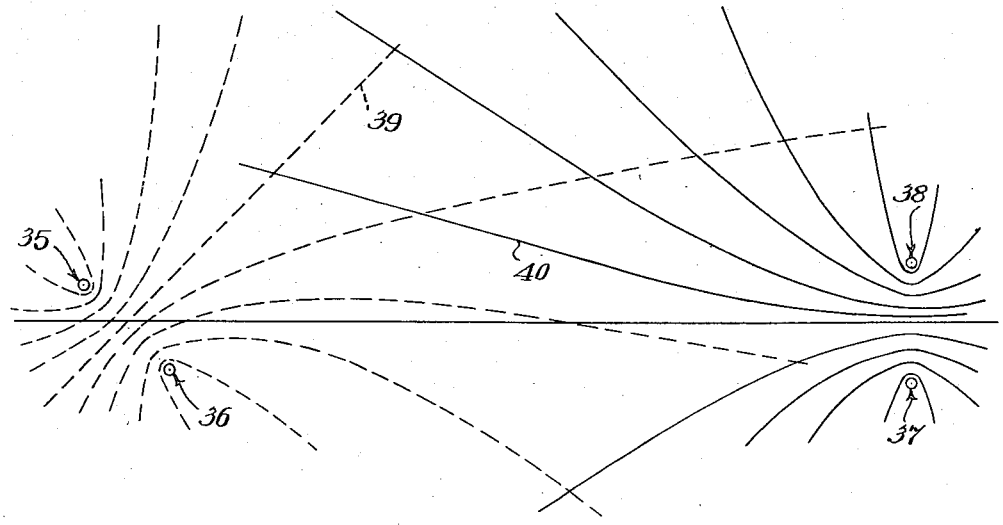

The method and apparatus of this invention is not necessarily limited to providing guidance or to determining the location of an airplane over a course which is comparable in length to the distance or separation between any pair of stations, but may be advantageously employed in navigating a plane over courses which are considerably longer than the separation between the stations. Referring to Fig. 7, stations 35 and 36 are shown separated by a relatively short distance, for example on the order of ten miles, more or less, to provide guidance along a course which may extend for a distance of 100 to several hundred miles. For example, an airplane may fly a straight or curved course along any one of the lines of constant phase relation 39 by maintaining the phase difference between the modulation frequencies received from stations 35 and 36 at a predetermined value, for example, 45°. The position of an airplane in flight along one of these paths of constant phase displacement as supplied by stations 35 and 36 may be readily determined by setting up a second pair of stations 37 and 38, so that the lines of constant phase relation produced thereby intersect the course to be followed by the plane. The pairs of stations are angularly displaced in such a manner that when the plane is flying on the given course the phase angle reading supplied by the stations 37 and 38 as indicated by phase difference lines 40, uniquely determines the position of the plane at that instant. It is not necessary for the plane to be exactly on the course to determine its location, since the phase angle reading taken on the stations 35 and 36 and then taken on stations 37 and 38 will immediately determine the location of the plane.

Obviously any straight, angular or curved courses may be flown over great distances by providing a sufficient number of properly spaced and modulated stations in accordance with the preceding description as should now be apparent.

Referring to Fig. 8, an arrangement is shown with which the course followed by a body, as well as the position of the body at any time, may be directly indicated or recorded. The apparatus as shown is primarily adapted for use with the apparatus illustrated in Fig. 4, although it may be used after obvious modification with the three-station arrangement illustrated in Fig. 6. The apparatus may comprise a translucent screen 50, upon which may be mounted a translucent map of the area over which the body is traveling with station units 35, 36, 37, and 38 marked upon it, which is shown positioned above light-directing means 57 mounted for angular rotation about two mutually transverse axes represented by shafts 51 and 52 respectively. A light source 58 is shown mounted in a housing and lens tube 59 so as to provide a light beam 59a which is directed by the light-directing means (a reflector in this case) to the translucent screen and map to provide a light spot 60 which may be caused to traverse the translucent screen 50 upon movement of either one or both of the shafts 51 and 52.

Actuating means for producing angular movement of shafts 51 and 52 are indicated respectively at 53 and 54 and are shown as comprising phase angle responsive means comparable to a common form of crossed coil Tuma phase angle indicator. The actuating means 53 is shown as comprising a field coil 55 mounted in a fixed position by supports 56 which may also provide bearings for shaft 51. Crossed coils 61 and 62 are fixed to the shaft 51 and are adapted to rotate the shaft 51 in accordance with changes in phase angle, as will be described more completely hereafter. The shaft 51 comprises one of the transverse axes about which the light-directing means 57 is moved and is secured to field coil 63 of second actuating means 54 and is adapted to rotate the actuating means 54 as a unit. A support is shown at 64 to provide another bearing for the shaft 51. The actuating means 54 is also provided with crossed coils which are designated as 65 and 66 and which are adapted to produce rotation of the shaft 52 in accordance with changes in phase angle. The shaft 52 constitutes the other of the transverse axes, and the light-directing means 57 is affixed thereto. The drawings being highly diagrammatic, no bearings for the shaft 52 are shown. Suitable means, not shown, are provided for connecting the actuating means 53 to the mobile receiver 41 for example, so that the rotation of shaft 51 will be in response to the phase difference between the modulations received from stations 35 and 36 while the actuating means 54 may be connected to the mobile receiver 41 in such manner as to be responsive to the phase angle between the modulations received from the stations 37 and 38.

In Fig. 9 the connection diagram for one of the actuating means, 54 for example, is shown in more detail. Field coil 63 is provided with leads 72 and 73 for connection to the mobile receiver 41a to carry the modulation obtained from said receiver from station 37, for example. Crossed coils 65 and 66 are shown positioned within the field coil and are carried by actuating shaft 52.

As is customary with such indicators, one of the crossed coils, 65 for example, is connected through an inductance 68 to a connecting lead 74 and the other of said coils is connected through a resistor 69 to another connection 75. Thus the currents in the coils 65 and 66 may be made to have any desired phase difference, for example 90°. By connecting leads 74 and 75 to the mobile receiving equipment 41a so as to carry the modulation supplied by station 38, the shaft 52 may be made to occupy different angular positions dependent upon the phase difference between the modulations obtained from receiver 41a and received from stations 37 and 38. It will be appreciated that the shaft 52 may carry a pointer and be used as a direct indicating phase angle responsive means, in which case the actuating means may be used as a phase angle meter in any of the previously described embodiments of my invention.

It may be seen that by rotation of either shaft 51 or 52 separately, one of the hyperbolic lines 39 or 40 will be traced on the translucent screen. The apparatus may be arranged so that these hyperbolic lines will have the same pattern or shape as those actually located in space with respect to the stations 35, 36, 37, and 38. With rotation of the light beam source around both axes 51 and 52, the spot of light produced upon the translucent screen by the light beam will automatically indicate the intersection of any two of the lines 39 and 40.

With the arrangement shown in Fig. 8 the housing and lens tube 59 will cast a shadow on the screen 50 when the light beam 59a is reflected directly back at the light source, corresponding to a position of the body in the center of the screen. However, this should present no particular disadvantage, since the lens tube may be made comparatively small. If desired the lens tube and light source may be located to one side of the screen, in which case the rest position of the reflecting means will be changed to take care of this situation. Also, the light-directing means 57 may comprise the lens tube 59 if desired.

Also, when it is difficult to obtain sufficient power to operate directly from the actuating means 53 and 54, other means such as control motors may be substituted for the actuating means to produce rotation of the shafts 51 and 52. Motors comparable to the potentiometer controlled "Modutrol" motors of the Minneapolis Honeywell Regulator Company may be used, in which case the actuating means 53 and 54 may be used to operate the control potentiometers of such motors.

By use of the gimbal arrangement described above for moving the light-directing means, it may be seen that the geographical location of a body may be indicated automatically and continuously on the translucent map. By providing a light sensitive film in place of or in conjunction with the map, the course followed by a mobile body may be permanently charted and recorded. It will be appreciated that it is not necessary for the light spot 60 to trace actual hyperbolic curves 39 and 40 since there will be only one position of the light spot for any one position of the body. Hence, the screen 50 may be provided with scale markings which may be referred to a map, or a distorted map or translucent screen may be provided.

It is not necessary to provide any fixed positions of radiation to obtain the advantages of this invention. For example, radiator 7 of Fig. 1 may be located on a moving body, as on an airplane, and receiver 9 and transmitter 1 may be located on a second mobile body, in which case the distance between the bodies may be readily determined and if desired the two bodies may maintain a given separation in accordance with the phase angle indication obtained from indicator 10. Under such circumstances it may be desirable to modulate the transmitter 1 with a comparatively high frequency so that a relatively close separation between the two sets of transmitters and receivers may be maintained.

The method and apparatus of this invention are subject to considerable modification without departing from the spirit of this invention, hence I do not choose to be restricted to the non-limitative examples described, but rather to the scope of the appended claims.

I claim:

1. The method of determining the location of a mobile body, which comprises: radiating a carrier wave from a fixed known location spaced from said body; radiating a carrier wave from said body; impressing a modulation frequency on one of said carrier waves; receiving said one modulated carrier wave adjacent the position of radiation of the other of said carrier waves; demodulating said received wave; impressing the modulation resulting from demodulating said received wave on said other carrier wave; receiving said modulated other carrier wave at a position adjacent the position of radiation of said one modulated carrier wave; demodulating said last-named received modulated carrier wave; comparing the phase relation between the modulation received from the last-mentioned demodulating step and the modulation impressed on said one carrier wave; and varying the frequency of the modulation impressed on said one carrier wave to produce a given value of said phase relation.

2. The method of determining the location of a mobile body, which comprises: radiating a carrier wave from a fixed known location spaced from said body; radiating a carrier wave from said body; impressing a modulation frequency on one of said carrier waves; receiving said one modulated carrier wave adjacent the position of radiation of the other of said carrier waves; demodulating said received wave; impressing the modulation resulting from demodulating said received wave on said other carrier wave; receiving said modulated other carrier wave at a position adjacent the position of radiation of said one modulated carrier wave; demodulating said last-named received modulated carrier wave; and comparing the phase relation between the modulation received from the last-mentioned demodulating step and the modulation impressed on said one carrier wave.

3. The method of determining the location of a mobile body which comprises: radiating carriers of the same frequency from a pair of radiators which are spaced a number of carrier wavelengths from one another in fixed known locations; modulating one of said carriers with one modulation frequency and the other of said carriers with a different modulation frequency having a given phase relation to said one modulation frequency, said modulation frequencies being integral multiples of a given modulation frequency, receiving said radiated modulated carriers on said mobile body; demodulating said received carriers; separating the two modulation frequencies obtained from said demodulating step; multiplying at least one of said separated modulation frequencies to obtain two separate modulations of the same frequency from the two different separated modulation frequencies; and comparing the phase relation between said two separate modulations of the same frequency.

4. An apparatus for use in determining the location of a mobile body, which comprises: radiating means for radiating a carrier wave from a known fixed location spaced a number of carrier wavelengths from said body; radiating means carried by said body for radiating a carrier wave from said body; a first modulator located adjacent one of said radiating means for modulating the carrier radiated from said one radiating means; means associated with the other of said radiating means for receiving and demodulating said one modulated carrier wave; a second modulator for modulating said other radiated carrier by the modulations received from said receiving and demodulating means; means associated with said one radiating means for receiving and demodulating said other radiated modulated carrier wave; and phase angle responsive means associated with said last-named receiving and demodulating means and with said first modulator for comparing the phase relation between the modulation supplied to said one carrier wave and the modulation received by said last-named receiving and demodulating means.

5. An apparatus for use in determining the location of a mobile body, which comprises: radiating means for radiating a carrier wave from a known fixed location spaced a number of carrier wavelengths from said body; radiating means carried by said body for radiating a carrier wave from said body; a first modulator located adjacent one of said radiating means for modulating the carrier radiated from said one radiating means; means associated with the other of said radiating means for receiving and demodulating said one modulated carrier wave; a second modulator for modulating said other radiated carrier by the modulations received from said receiving and demodulating means; means associated with said one radiating means for receiving and demodulating said other radiated modulated carrier wave; phase angle responsive means associated with said last-named receiving and demodulating means and with said first modulator for comparing the phase relation between the modulation supplied to said one carrier wave and the modulation received by said last-named receiving and demodulating means; and means for varying said modulation frequency to produce a given value of comparison on said phase angle responsive means.

6. An apparatus for use in determining the location of a mobile body, which comprises: means for radiating carrier waves of the same frequency from a pair of widely spaced radiators which are located in fixed known locations; means for modulating each of said carriers with a different modulation frequency and in a given phase relation, said modulation frequencies being integral multiples of a given modulation frequency; receiving means carried by said body for receiving and demodulating both of said modulated carriers; means associated with said receiving means for separating said two received modulations and for multiplying at least one of said separated received modulations to thereby produce two separated modulations of the same frequency from the separated modulations of different frequency; and means carried on said body for comparing the phase relation between the two separated received modulations of the same frequency.

7. In a radio navigation apparatus for determining the location of a body, the combination which comprises: transmitting apparatus having two sources of different frequency carrier waves; means including a source of relatively low frequency oscillation for respectively modulating the carrier waves of the first named sources; a pair of modulation systems for superimposing the low frequency oscillation upon each of the carrier waves; phase shifting means for producing a given phase relation of the modulation as applied to the two carrier waves from the first named sources; a pair of non-directional vertical radiators for separately radiating the modulated carrier waves; and receiving apparatus carried on said body for separately and simultaneously amplifying and demodulating the modulated carrier waves received from the two radiators, including means for applying the received space phase displaced modulation waves to a phase angle indicator, whereby the difference of the distances to said body from each radiator is indicated.

8. In an apparatus for determining the location of a body, the combination which comprises: transmitting apparatus having sources of carrier waves of a given frequency with two spaced non-directional radiators for simultaneously radiating said carrier waves of the same given frequency; a source of relatively low frequency oscillations; a frequency multiplier connected therewith for multiplying said oscillations; a pair of modulation systems for superimposing the relatively low frequency oscillations upon the carrier waves radiated from one radiator and the multiplied low frequency oscillations upon the carrier waves radiated from the other radiator; phase shifting means for producing a given phase relation between the modulating oscillations as radiated from the respective radiators; receiving apparatus carried on said body for simultaneously receiving, amplifying and demodulating the two modulation frequency differentiated carrier waves from the respective radiators, including means for applying the two different modulating oscillations as received to two filter networks in which one of said networks is responsive to the relatively low frequency oscillations and the other responsive to the multiplied low frequency oscillations; a frequency multiplier connected to multiply the relatively low frequency oscillations, as filtered, by an amount equal to the multiplication of the frequency multiplier first named; and means for applying the two filtered multiplied oscillations in the same relation as received to a phase angle indicator, whereby the location of the receiving apparatus with respect to the radiators is indicated.

9. In an apparatus in accordance with claim 8, the frequency of the multiplied low frequency oscillation being such that one-quarter of its electrical wavelength is not less than the distance between the spaced non-directional radiators.

10. In an apparatus for use in determining the location of a body, in which modulated carrier waves are radiated from at least three angularly spaced radiators and said modulated waves are received in receiving means provided on said body, the combination which comprises: a light source providing a light beam; a screen; light-directing means mounted for angular rotation about two mutually transverse axes to direct the light beam onto said screen; means for moving said directing means about one of said axes in response to changes in the phase displacement between the modulations received from one pair of said radiators; and means for moving said directing means about the other of said axes in response to changes in the phase displacement between the modulation received from another pair of said radiators.

11. In an apparatus for use in determining the location of a body, in which modulated carrier waves are radiated from at least three angularly spaced radiators and said modulated waves are received in receiving means provided on said body, the combination which comprises: a light source providing a light beam; a screen; light-directing means mounted for angular rotation about two mutually transverse axes to direct the light beam onto said screen; and means for moving said directing means about at least one of said axes in response to changes in the phase displacement between the modulations received from one pair of said radiators.

PAUL J. HOLMES.